US012571405B1

(12) United States Patent
Kray et al.

(10) Patent No.: US 12,571,405 B1
(45) Date of Patent: Mar. 10, 2026

(54) PROPULSOR ASSEMBLY FOR A TURBINE ENGINE

(71) Applicants:General Electric Company, Evendale, OH (US); GE Aerospace Poland Sp. z o.o., Warsaw (PL)

(72) Inventors: Nicholas J. Kray, Mason, OH (US); Robert Kamiński, Warsaw (PL); Arthur W. Sibbach, Boxford, MA (US)

(73) Assignees: GENERAL ELECTRIC COMPANY, Evendale, OH (US); GE AEROSPACE POLAND SP. Z O.O., Warsaw (PL)

( * ) Notice: Subject to any disclaimer, the term of this patent is extended or adjusted under 35 U.S.C. 154(b) by 0 days.

(21) Appl. No.: 19/063,846

(22) Filed: Feb. 26, 2025

(51) Int. Cl.
| | |
|---|---|
| *F01D 7/00* | (2006.01) |
| *F04D 29/34* | (2006.01) |
| *F04D 29/36* | (2006.01) |
| *F04D 29/60* | (2006.01) |
| *B64C 11/06* | (2006.01) |

(52) U.S. Cl.
CPC .............. *F04D 29/362* (2013.01); *F01D 7/00* (2013.01); *F04D 29/34* (2013.01); *F04D 29/601* (2013.01); *B64C 11/06* (2013.01)

(58) Field of Classification Search
CPC .......... F04D 29/362; F04D 7/00; F04D 29/34; F04D 29/601; B64C 11/06
See application file for complete search history.

(56) References Cited

U.S. PATENT DOCUMENTS

| | | | | |
|---|---|---|---|---|
| 2,460,910 A | * | 2/1949 | Sheets ..................... | B64C 11/06 |
| | | | | 416/220 A |
| 2,500,692 A | | 3/1950 | Martin et al. | |
| 2,514,477 A | * | 7/1950 | Cushman ................ | B64C 11/06 |
| | | | | 416/89 |
| 2,533,358 A | * | 12/1950 | Cushman ................ | B64C 11/06 |
| | | | | 416/89 |
| 2,648,391 A | | 8/1953 | Cushman et al. | |
| 3,893,789 A | * | 7/1975 | Andrews ................... | F01D 7/00 |
| | | | | 415/129 |

(Continued)

FOREIGN PATENT DOCUMENTS

| | | |
|---|---|---|
| CA | 115885110 A | 3/2023 |
| CN | 115968428 A | 4/2023 |

(Continued)

*Primary Examiner* — Courtney D Heinle
*Assistant Examiner* — Andrew J Marien
(74) *Attorney, Agent, or Firm* — Venable LLP; Michael C. Sanko; Michele V. Frank

(57) ABSTRACT

A propulsor assembly for a turbine engine includes a propulsor and a propulsor actuation system. The propulsor has a plurality of propulsor blades. Each of the plurality of propulsor blades is rotatable about a blade pitch axis. The propulsor actuation system includes an actuator for rotating the plurality of propulsor blades and a trunnion mechanism that includes a plurality of trunnion assemblies. Each of the plurality of trunnion assemblies is coupled to a respective one of the plurality of propulsor blades and includes an outer sleeve coupled to a blade spar of the respective propulsor blade, an inner sleeve coupled to the outer sleeve, and an actuation member that engages the inner sleeve. The actuation member is rotatably engageable by the actuator to rotate the respective propulsor blade about the blade pitch axis.

20 Claims, 6 Drawing Sheets

(56)     References Cited

U.S. PATENT DOCUMENTS

| | | | | |
|---|---|---|---|---|
| 3,902,822 A | * | 9/1975 | Andrews | F02C 7/36 |
| | | | | 416/170 R |
| 4,762,466 A | * | 8/1988 | Bouiller | F01D 5/02 |
| | | | | 416/205 |
| 5,015,150 A | * | 5/1991 | Rohra | F01D 5/3007 |
| | | | | 416/207 |
| 10,364,020 B2 | | 7/2019 | Curnock et al. | |
| 11,780,562 B2 | | 10/2023 | Cottet et al. | |
| 2010/0239421 A1 | * | 9/2010 | Boston | F04D 29/323 |
| | | | | 416/136 |
| 2022/0135207 A1 | * | 5/2022 | Cottet | F01D 7/00 |
| | | | | 416/154 |

FOREIGN PATENT DOCUMENTS

| | | | |
|---|---|---|---|
| EP | 0344671 | B1 | 4/1992 |
| FR | 3127269 | A1 | 3/2023 |
| FR | 3130896 | A1 | 6/2023 |
| FR | 3130897 | A1 | 6/2023 |
| FR | 3133367 | A1 | 9/2023 |
| FR | 3133368 | A1 | 9/2023 |
| GB | 539303 | A | 9/1941 |
| GB | 606524 | A | 8/1948 |

* cited by examiner

600

610

Disengage an outer sleeve of a
trunnion assembly from a
fan actuation system

620

Disengage an inner sleeve of the
trunnion assembly from an actuation
member of the trunnion assembly

630

Remove a fan blade from
the fan actuation system

PROPULSOR ASSEMBLY FOR A TURBINE ENGINE

TECHNICAL FIELD

The present disclosure relates generally to propulsor actuation systems for turbine engines.

BACKGROUND

Turbine engines, for example, for an aircraft, generally include a propulsor having propulsor blades and a turbo-engine arranged in flow communication with one another. Some turbine engines include a propulsor actuation system for actuating the propulsor blades of the propulsor.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
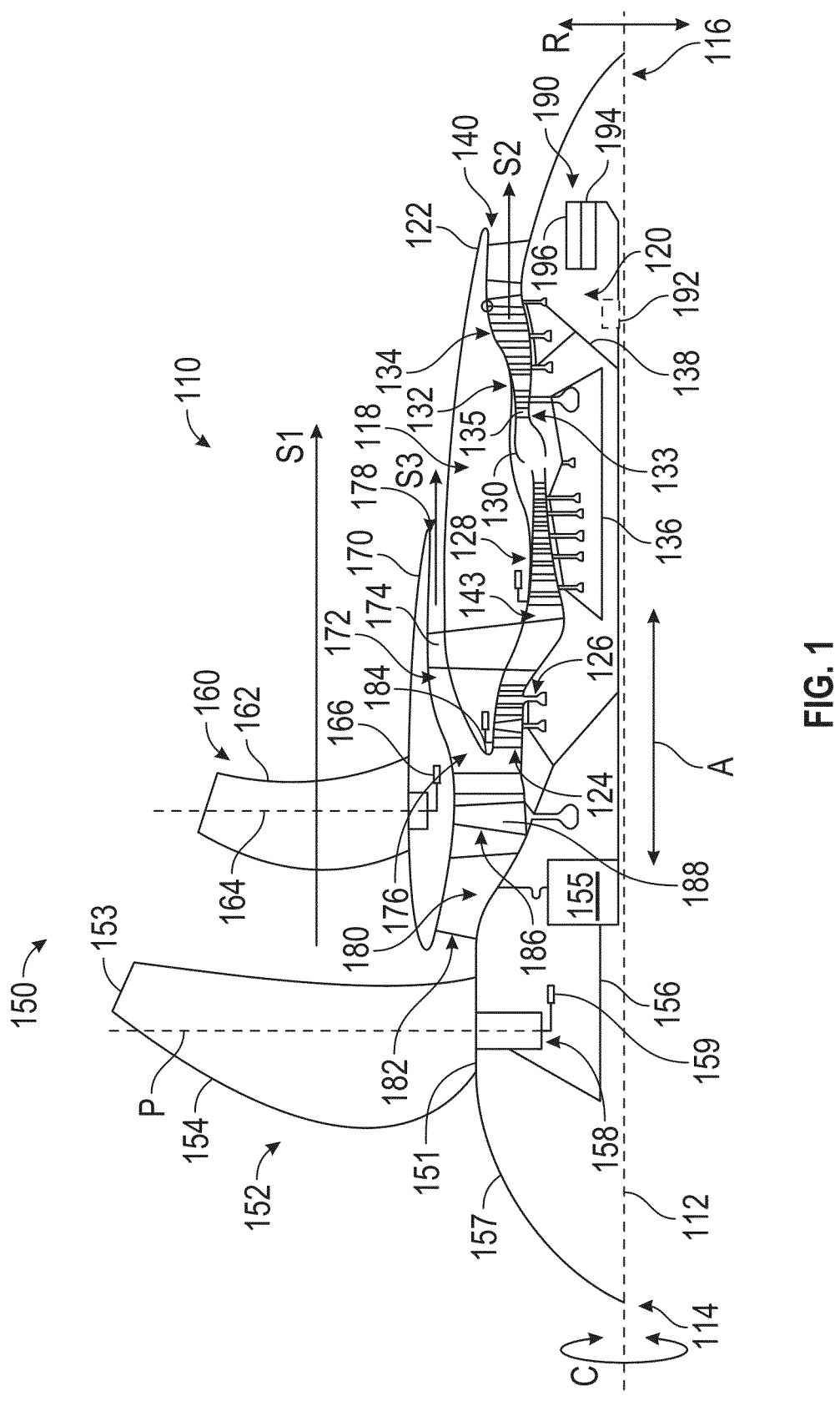
FIG. 1 is a schematic view of turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," "third," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel (i.e., parallel to within five degrees) to a longitudinal centerline axis of the turbine engine. Moreover, the terms "radial" and "radially" refer to directions and orientations that extend substantially perpendicular to the longitudinal centerline axis of the turbine engine. In addition, as used herein, the terms "circumferential" and "circumferentially" refer to directions and orientations that extend arcuately about the centerline of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides for turbine engines that have a variable pitch propulsor. Such engines include a propulsor actuation system that includes one or more actuators for changing a pitch of propulsor blades of the variable pitch propulsor. The propulsor actuation system typically includes actuators that are coupled to the propulsor blades and actuation of the actuators causes the propulsor blades to rotate about a blade pitch axis to change the pitch of the propulsor blades. Some propulsor actuation systems are designed for turbofan engines that include a fan or for turboprop engines that include a propeller.

Conventional propulsor actuation systems include a plurality of trunnion mechanisms that are coupled to respective propulsor blades and are engaged by the actuators at an actuator arm of the trunnion mechanisms. In some situations, one or more propulsor blades of the variable pitch propulsor may need to be removed and replaced. However, actuator arms of conventional trunnion mechanisms typically need to extend at an angle relative to the blade pitch axis in order for the actuators to engage the actuator arms, which prevents the propulsor blade from easily being removed from the engine without risking damage to the propulsor blades, the propulsor assembly, or the engine. Further, the actuator arms are formed as one piece with the trunnion mechanism. As such, actuator arms of conventional trunnion mechanisms typically require disassembly of the entire propulsor hub or other parts of the engine in order to remove individual propulsor blades. However, disassembly of the propulsor hub or other parts of the engine can require a significant amount of time and results in significant downtime of an aircraft having the engine with the conventional propulsor actuation system.

Accordingly, the present disclosure provides for an improved interface between a pitch-controlled airfoil or a propulsor and a pitching mechanism of an engine, which can provide positive engagement of the pitching mechanism and allow for easy flight-line replaceable propulsors of a propulsor assembly. Particularly, embodiments of the present disclosure can permit pure radial removal of a propulsor from a pitch change mechanism thus limiting the risk of damage to a trunnion of such a mechanism and can provide reduction of downtime of an aircraft having an engine with such a propulsor actuation mechanism.

Referring now to the drawings, FIG. 1 is a schematic view of an exemplary turbine engine 110 for an aircraft that may incorporate one or more embodiments of the present disclosure. More specifically, in the illustrated embodiment, the turbine engine 110 is an unducted, three-stream, turbofan engine for an aircraft. In this way, the turbine engine 110 is an unducted fan engine or an open fan engine. The turbine engine 110 is a "three-stream engine" in that its architecture provides three distinct streams (labeled S1, S2, and S3) of thrust-producing airflow during operation, as detailed further below.

As shown in FIG. 1, the turbine engine 110 defines an axial direction A, a radial direction R, and a circumferential direction C. Moreover, the turbine engine 110 defines a longitudinal centerline axis 112 that extends along the axial direction A. In general, the axial direction A extends parallel to the longitudinal centerline axis 112, the radial direction R extends outward from, and inward to, the longitudinal centerline axis 112 in a direction orthogonal to the axial direction A, and the circumferential direction C extends three hundred sixty degrees (360°) around the longitudinal centerline axis 112. The turbine engine 110 extends between a forward end 114 and an aft end 116, e.g., along the axial direction A.

The turbine engine 110 includes a turbo-engine 120 and a propulsor assembly 150, e.g., a fan assembly, positioned upstream thereof. Generally, the turbo-engine 120 includes a compressor section, a combustion section, a turbine section, and an exhaust section. Particularly, as shown in FIG. 1, the turbo-engine 120 includes an engine core 118 and a core cowl 122 that annularly surrounds the turbo-engine 120. The turbo-engine 120 and the core cowl 122 define a core inlet 124 having an annular shape that is annular about the longitudinal centerline axis 112. The core cowl 122 further encloses and supports a low-pressure (LP) compressor 126 (also referred to as a booster) for pressurizing air that enters the turbo-engine 120 through the core inlet 124. A high-pressure (HP) compressor 128 receives pressurized air from the LP compressor 126 and further increases the pressure of the air. The pressurized air flows downstream to a combustor 130 where fuel is injected into the pressurized air and ignited to raise the temperature and the energy level of the pressurized air, which generates combustion gases.

With continued reference to FIG. 1, the combustion gases flow from the combustor 130 downstream to a high-pressure (HP) turbine 132. The HP turbine 132 drives the HP compressor 128 through a first shaft, also referred to as a high-pressure (HP) shaft 136 (also referred to as a "high-speed shaft"). In this regard, the HP turbine 132 is drivingly coupled with the HP compressor 128. Together, the HP compressor 128, the combustor 130, and the HP turbine 132 define the engine core 118. The combustion gases then flow to a power turbine or a low-pressure (LP) turbine 134. The LP turbine 134 drives the LP compressor 126 and components of the propulsor assembly 150 through a second shaft, also referred to as a low-pressure (LP) shaft 138 (also referred to as a "low-speed shaft"). In this regard, the LP turbine 134 is drivingly coupled with the LP compressor 126 and components of the propulsor assembly 150. The LP shaft 138 is coaxial with the HP shaft 136 in the embodiment of FIG. 1. After driving each of the HP turbine 132 and the LP turbine 134, the combustion gases exit the turbo-engine 120 through a core exhaust nozzle 140. The turbo-engine 120 defines a core flowpath, also referred to as a core duct 143, that extends between the core inlet 124 and the core exhaust nozzle 140. The core duct 143 is an annular duct positioned generally inward of the core cowl 122 along the radial direction R.

The propulsor assembly 150 includes a propulsor 152, also referred to a primary propulsor or a fan. For the embodiment of FIG. 1, the propulsor 152 is an open rotor fan, also referred to as an unducted fan. However, in other embodiments, the propulsor 152 may be a ducted fan, e.g., by a fan casing or a nacelle circumferentially surrounding the fan. The propulsor 152 includes a plurality of propulsor blades 154 (only one shown in FIG. 1), e.g., a plurality of fan blades, that extends in the radial direction R from a propulsor root 151 to a propulsor tip 153. The plurality of propulsor blades 154 is rotatable about the longitudinal centerline axis 112 via a propulsor shaft 156, e.g., a fan shaft. As shown in FIG. 1, the propulsor shaft 156 is coupled with the LP shaft 138 via a speed reduction gearbox or a power gearbox, also referred to as a gearbox assembly 155, e.g., in an indirect-drive configuration.

The gearbox assembly 155 is shown schematically in FIG. 1. The gearbox assembly 155 includes a plurality of gears for adjusting the rotational speed of the propulsor shaft 156 and, thus, the propulsor 152 relative to the LP shaft 138 to a more efficient rotational propulsor speed. The gearbox assembly may have a gear ratio of 4:1 to 12:1, or 7:1 to 12:1, or 4:1 to 10:1, or 5:1 to 9:1, or 6:1 to 9:1, and may be configured in an epicyclic star or a planet gear configuration. Preferably, the gearbox assembly has a gear ratio of 4:1 to 10:1 for an unducted fan engine (e.g., the turbine engine 110). The gearbox may be a single stage gearbox or a compound gearbox (e.g., having a plurality of stages). The LP shaft 138, the gearbox assembly 155, and the propulsor shaft 156 are disposed in an in-line configuration such that the LP shaft 138, the gearbox assembly 155, and the propulsor shaft 156 are coaxial and are each disposed about the longitudinal centerline axis 112.

The propulsor blades 154 can be arranged in equal spacing around the longitudinal centerline axis 112. Each propulsor blade 154 extends outwardly from a disk 142 (see FIG. 2) generally along the radial direction R. The disk 142 is covered by a propulsor hub 157 that is rotatable and aerodynamically contoured to promote an airflow through the plurality of propulsor blades 154. Each propulsor blade 154 has a root and a tip, and a span defined therebetween. Each of the plurality of propulsor blades 154 defines a blade pitch axis P. For the embodiment of FIG. 1, each of the plurality of propulsor blades 154 of the propulsor 152 is rotatable about their respective blade pitch axis P, e.g., in unison with one another. A propulsor actuation system 158 controls one or more actuators 159 to pitch the propulsor blades 154 about their respective blade pitch axis P. The propulsor actuation system 158 is disposed within the propulsor hub 157.

The propulsor assembly 150 further includes a propulsor guide vane array 160 that includes a plurality of propulsor guide vanes 162 (only one shown in FIG. 1) disposed around the longitudinal centerline axis 112. For the embodiment of FIG. 1, the plurality of propulsor guide vanes 162 is not rotatable about the longitudinal centerline axis 112. Each of the plurality of propulsor guide vanes 162 has a root and a tip, and a span defined therebetween. The plurality of propulsor guide vanes 162 can be unshrouded, as shown in FIG. 1, or can be shrouded, e.g., by an annular shroud spaced outward from the tips of the propulsor guide vanes 162 along the radial direction R. Each of the plurality of propulsor guide vanes 162 defines a vane pitch axis 164. For the embodiment of FIG. 1, each of the plurality of propulsor guide vanes 162 of the propulsor guide vane array 160 is rotatable about their respective vane pitch axis 164, e.g., in unison with one another. One or more actuators 166 are controlled to pitch the plurality of propulsor guide vanes 162 about their respective vane pitch axis 164. In other embodiments, each of the plurality of propulsor guide vanes 162 is fixed or is unable to be pitched about the vane pitch axis 164. The plurality of propulsor guide vanes 162 is mounted to a propulsor cowl 170.

The propulsor cowl 170 annularly encases at least a portion of the core cowl 122 and is generally positioned outward of the core cowl 122 along the radial direction R. Particularly, a downstream section of the propulsor cowl 170 extends over a forward portion of the core cowl 122 to define a propulsor flowpath, also referred to as a propulsor duct 172. Incoming air enters through the propulsor duct 172 through a propulsor duct inlet 176 and exits through a propulsor exhaust nozzle 178 to produce propulsive thrust. The propulsor duct 172 is an annular duct positioned generally outward of the core duct 143 along the radial direction R. The propulsor cowl 170 and the core cowl 122 are connected together and supported by a plurality of struts 174 (only one shown in FIG. 1) that extends substantially radially and are circumferentially spaced about the longitudinal centerline axis 112. Each strut of the plurality of struts 174 is aerodynamically contoured to direct air flowing thereby. Other struts, in addition to the plurality of struts 174, can be used to connect and to support the propulsor cowl 170 and the core cowl 122.

The turbine engine 110 also defines or includes an inlet duct 180. The inlet duct 180 extends between an engine inlet 182 and the core inlet 124 and the propulsor duct inlet 176. The engine inlet 182 is defined generally at the forward end of the propulsor cowl 170 and is positioned between the propulsor 152 and the propulsor guide vane array 160 along the axial direction A. The inlet duct 180 is an annular duct that is positioned inward of the propulsor cowl 170 along the radial direction R. Air flowing downstream along the inlet duct 180 is split, not necessarily evenly, into the core duct 143 and the propulsor duct 172 by a splitter 184 of the core cowl 122. The inlet duct 180 is wider than the core duct 143 along the radial direction R. The inlet duct 180 is also wider than the propulsor duct 172 along the radial direction R.

In the illustrated embodiment, the propulsor assembly 150 also includes a mid-fan 186, which includes a plurality of mid-fan blades 188 (only one shown in FIG. 1) that is rotatable, e.g., about the longitudinal centerline axis 112. The mid-fan 186 is drivingly coupled with the LP turbine 134 via the LP shaft 138. The plurality of mid-fan blades 188 can be arranged in equal circumferential spacing about the longitudinal centerline axis 112. The plurality of mid-fan blades 188 is annularly surrounded (e.g., ducted) by the propulsor cowl 170. In this regard, the mid-fan 186 is positioned inward of the propulsor cowl 170 along the radial direction R. The mid-fan 186 is positioned within the inlet duct 180 upstream of both the core duct 143 and the propulsor duct 172. A ratio of a span of a propulsor blade 154 to that of a mid-fan blade 188 (a span is measured from a root to tip of the respective blade) is greater than 2:1 and less than 10:1, to achieve the desired benefits of the third stream (S3), particularly, the additional thrust it offers to the engine, which can enable a smaller diameter propulsor blade 154 (benefits engine installation).

Accordingly, air flowing through the inlet duct 180 flows across the plurality of mid-fan blades 188 and is accelerated downstream thereof. At least a portion of the air accelerated by the mid-fan blades 188 flows into the propulsor duct 172 and is ultimately exhausted through the propulsor exhaust nozzle 178 to produce propulsive thrust. Also, at least a portion of the air accelerated by the plurality of mid-fan blades 188 flows into the core duct 143 and is ultimately exhausted through the core exhaust nozzle 140 to produce propulsive thrust. Generally, the mid-fan 186 is a compression device positioned downstream of the engine inlet 182. The mid-fan 186 is operable to accelerate air into the propulsor duct 172, also referred to as a secondary bypass passage.

During operation of the turbine engine 110, an initial airflow or an incoming airflow passes through the propulsor blades 154 of the propulsor 152 and splits into a first airflow and a second airflow. The first airflow bypasses the engine inlet 182 and flows generally along the axial direction A outward of the propulsor cowl 170 along the radial direction R. The first airflow accelerated by the propulsor blades 154 passes through the propulsor guide vanes 162 and continues downstream thereafter to produce a primary propulsion stream or a first thrust stream S1. A majority of the net thrust produced by the turbine engine 110 is produced by the first thrust stream S1. The second airflow enters the inlet duct 180 through the engine inlet 182.

The second airflow flowing downstream through the inlet duct 180 flows through the plurality of mid-fan blades 188 of the mid-fan 186 and is consequently compressed. The second airflow flowing downstream of the mid-fan blades 188 is split by the splitter 184 located at the forward end of the core cowl 122. Particularly, a portion of the second airflow flowing downstream of the mid-fan 186 flows into the core duct 143 through the core inlet 124. The portion of the second airflow that flows into the core duct 143 is progressively compressed by the LP compressor 126 and the HP compressor 128, and is ultimately discharged into the combustion section. The discharged pressurized air stream flows downstream to the combustor 130 where fuel is introduced to generate combustion gases or products.

The combustor 130 defines an annular combustion chamber that is generally coaxial with the longitudinal centerline axis 112. The combustor 130 receives pressurized air from the HP compressor 128 via a pressure compressor discharge outlet. A portion of the pressurized air flows into a mixer. Fuel is injected by a fuel nozzle (omitted for clarity) to mix with the pressurized air thereby forming a fuel-air mixture that is provided to the combustion chamber for combustion. Ignition of the fuel-air mixture is accomplished by one or more igniters (omitted for clarity), and the resulting combustion gases flow along the axial direction A toward, and into, a first stage turbine nozzle 133 of the HP turbine 132. The first stage turbine nozzle 133 is defined by an annular flow channel that includes a plurality of radially extending, circumferentially-spaced nozzle vanes 135 that turn the combustion gases so that the combustion gases flow angularly and impinge upon first stage turbine blades of the HP turbine 132. The combustion gases exit the HP turbine 132 and flow through the LP turbine 134, and exit the core duct 143 through the core exhaust nozzle 140 to produce a core air stream, also referred to as a second thrust stream S2. As noted above, the HP turbine 132 drives the HP compressor 128 via the HP shaft 136, and the LP turbine 134 drives the LP compressor 126, the propulsor 152, and the mid-fan 186 via the LP shaft 138.

The other portion of the second airflow flowing downstream of the mid-fan 186 is split by the splitter 184 into the propulsor duct 172. The air enters the propulsor duct 172 through the propulsor duct inlet 176. The air flows generally along the axial direction A through the propulsor duct 172 and is ultimately exhausted from the propulsor duct 172 through the propulsor exhaust nozzle 178 to produce a third stream, also referred to as the third thrust stream S3.

The third thrust stream S3 is a secondary air stream that increases fluid energy to produce a minority of total propulsion system thrust. In some embodiments, a pressure ratio of the third stream is higher than that of the primary propulsion stream (e.g., a bypass or a propeller driven propulsion stream). The thrust may be produced through a dedicated nozzle or through mixing of the secondary air stream with the primary propulsion stream or a core air stream, e.g., into a common nozzle. In certain embodiments, an operating temperature of the secondary air stream is less than a maximum compressor discharge temperature for the engine. Furthermore, in certain embodiments, aspects of the third stream (e.g., airstream properties, mixing properties, or exhaust properties) and a percent contribution to total thrust, are passively adjusted during engine operation or can be modified purposefully through the use of engine control features (such as fuel flow, electric machine power, variable stators, variable inlet guide vanes, valves, variable exhaust geometry, or fluidic features) to adjust or to improve overall system performance across a broad range of potential operating conditions.

The turbine engine 110 depicted in FIG. 1 is by way of example only. In other embodiments, the turbine engine 110 may have other suitable configurations. For example, the propulsor 152 can be ducted by a fan casing or a nacelle such that a bypass passage is defined between the fan casing and the propulsor cowl 170. Moreover, in other embodiments, any other suitable number or configuration of compressors, turbines, shafts, or a combination thereof may be provided. In still other embodiments, aspects of the present disclosure may be incorporated into any other suitable turbine engine, such as, for example, turbofan engines, propfan engines, turboprop, and/or turbine engines defining two streams (e.g., a bypass stream and a core air stream).

Further, for the depicted embodiment of FIG. 1, the turbine engine 110 includes an electric machine 190 (e.g., a motor-generator) operably coupled with a rotating component thereof. In this regard, the turbine engine 110 is a hybrid-electric propulsion machine. Particularly, as shown in FIG. 1, the electric machine 190 is operatively coupled with the LP shaft 138. The electric machine 190 can be mechanically connected to the LP shaft 138, either directly, or indirectly, e.g., by way of a gearbox assembly 192 (shown schematically in FIG. 1). Further, although, in this embodiment, the electric machine 190 is operatively coupled with the LP shaft 138 at an aft end of the LP shaft 138, the electric machine 190 can be coupled with the LP shaft 138 at any suitable location or can be coupled to other rotating components of the turbine engine 110, such as the HP shaft 136 or the LP shaft 138. For instance, in some embodiments, the electric machine 190 can be coupled with the LP shaft 138 and positioned forward of the mid-fan 186 along the axial direction A. In some embodiments, the turbine engine 110 of FIG. 1 can include a plurality of electric machines.

In some embodiments, the electric machine 190 can be an electric motor operable to drive or to motor the LP shaft 138. In other embodiments, the electric machine 190 can be an electric generator operable to convert mechanical energy into electrical energy. In this way, electrical power generated by the electric machine 190 can be directed to various engine systems or aircraft systems. In some embodiments, the electric machine 190 can be a motor/generator with dual functionality. The electric machine 190 includes a rotor 194 and a stator 196. The rotor 194 is coupled to the LP shaft 138 and rotates with rotation of the LP shaft 138. In this way, the rotor 194 rotates with respect to the stator 196, generating electrical power. Although the electric machine 190 has been described and illustrated in FIG. 1 as having a particular configuration, the present disclosure may apply to electric machines having alternative configurations. For instance, the rotor 194 or the stator 196 may have different configurations or may be arranged in a different manner than illustrated in FIG. 1.

Figure 2:
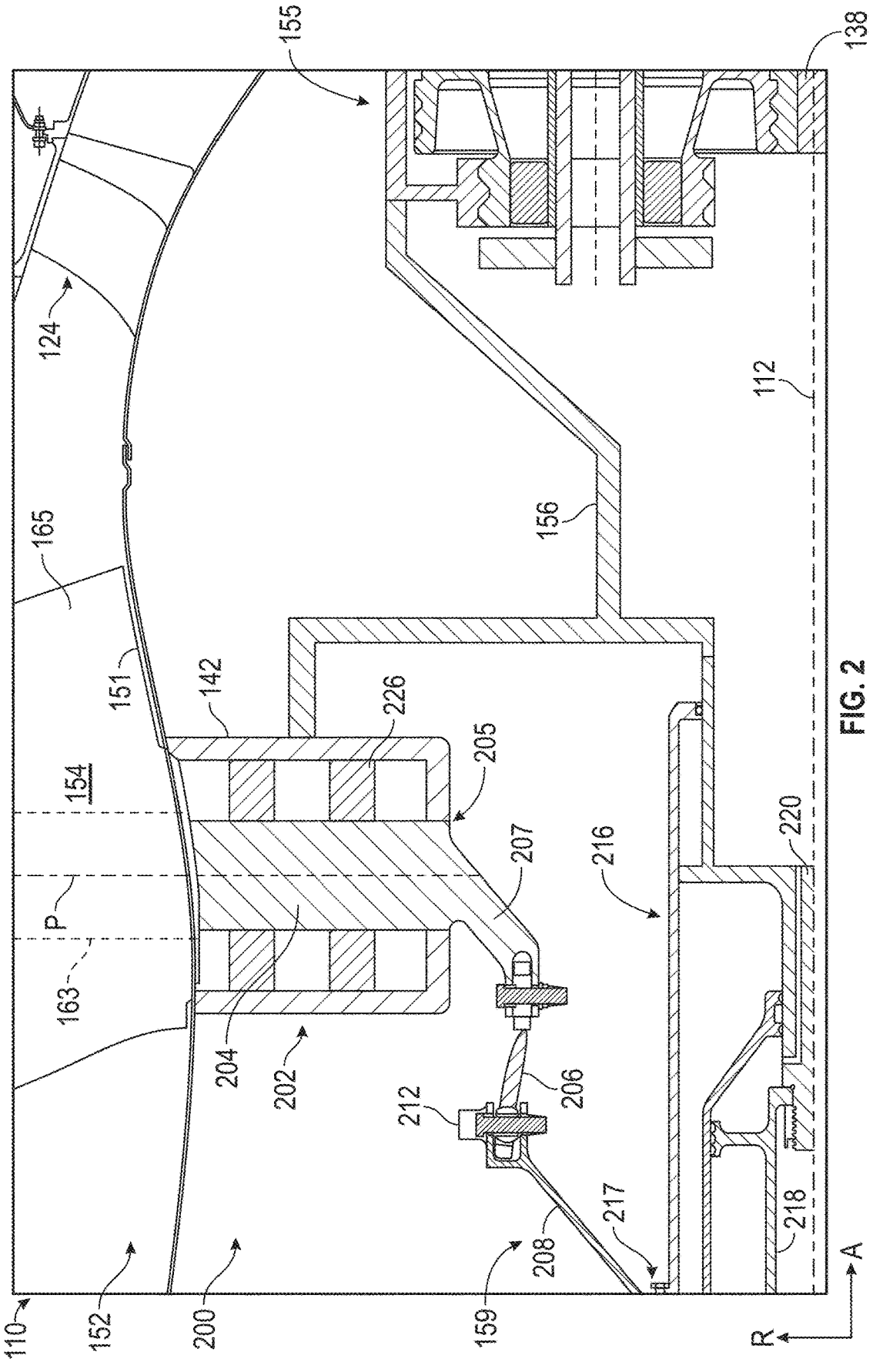
FIG. 2 is a partial, schematic, cross-sectional view of a propulsor actuation system for the turbine engine of FIG. 1, taken along the longitudinal centerline axis of the turbine engine, according to the present disclosure.

FIG. 2 is a partial, schematic, cross-sectional view of an exemplary propulsor actuation system 200 for the propulsor 152 of the turbine engine 110, taken along the longitudinal centerline axis 112 of the turbine engine 110, according to the present disclosure. Only the top half of the propulsor actuation system 200 is shown in FIG. 2. However, the propulsor actuation system 200 is symmetrical about the longitudinal centerline axis 112. The propulsor actuation system 200 may also be referred to as a fan pitch actuation system (FPAS). The propulsor actuation system 200 controls the pitch (e.g., angle, orientation) of the plurality of propulsor blades 154 about the blade pitch axis P.

FIG. 2 shows the propulsor shaft 156 of the turbine engine 110 (FIG. 1), which is coupled to, and driven by, the LP shaft 138. As shown in FIG. 2, the disk 142 is coupled to (e.g., directly or indirectly), and driven by, the propulsor shaft 156. Each of the plurality of propulsor blades 154 is coupled to, and extends radially outward from, the disk 142. Therefore, as the propulsor shaft 156 is rotated (via the LP shaft 138), the propulsor shaft 156 rotates the disk 142, which rotates the plurality of propulsor blades 154 to generate thrust.

In the illustrated embodiment, the propulsor actuation system 200 includes a trunnion mechanism 202 including a plurality of trunnions 204. Each propulsor blade 154 is coupled to a respective one of the plurality of trunnions 204. In particular, each propulsor blade 154 has a blade spar 163, which provides structural support to the propulsor blade 154, surrounded by a blade shell 165, which defines the outer profile of the propulsor blade 154. The blade spar 163 extends in the radial direction R from, or below, the propulsor root 151 toward the propulsor tip 153 (FIG. 1). As such, the blade spar 163 of each of the propulsor blades 154 is coupled to the respective trunnion 204. In some embodiments, the blade spar 163 can extend in the radial direction R along an entire length of the propulsor blade 154 from the propulsor root 151 to the propulsor tip 153.

The plurality of trunnions 204 extends through a disk opening 205 in the disk 142. The plurality of trunnions 204 is rotatable in the disk opening 205. This enables the plurality of propulsor blades 154 to rotate about the blade pitch axis P. As such, the pitch of the plurality of propulsor blades 154 can be changed relative to the flow of a volume of air. The turbine engine 110 also includes one or more thrust bearings 226 disposed between the trunnion 204 and the disk 142 such that the trunnion 204 rotates about the blade pitch axis P with respect to the disk 142. The one or more thrust bearings 226 transmit the load from the respective propulsor blade 154 to a static structure of the turbine engine 110.

Referring still to FIG. 2, the propulsor actuation system 200 includes a plurality of trunnion links 206 and a unison ring 208. The plurality of trunnion links 206 is pivotably coupled to the plurality of trunnions 204. For example, each trunnion link 206 is coupled to an actuation arm 207 of each respective trunnion 204 and to the unison ring 208. In this way, the unison ring 208 couples the plurality of trunnions 204 together. The plurality of trunnion links 206 is coupled to the unison ring 208 via a plurality of pins 212. In this way, the plurality of trunnions 204 is pivotably coupled to the unison ring 208 such that the plurality of trunnions 204, and, thus, the plurality of propulsor blades 154, can pivot about the blade pitch axis P in unison, as detailed further below.

The propulsor actuation system 200 includes one or more actuators 159. In the illustrated embodiment, the one or more actuators 159 includes a hydraulic cylinder 216, a piston 218, and a piston retainer 220. The piston retainer 220 is coupled (e.g., bolted) to the propulsor shaft 156 such that the piston retainer 220 rotates with the propulsor shaft 156. Therefore, the piston retainer 220 is coupled (e.g., indirectly) to, and rotated by, the LP shaft 138. Also, the piston 218 is coupled to, and extends in a forward direction, from the piston retainer 220. Therefore, the piston 218 also rotates with the piston retainer 220 and the propulsor shaft 156. The hydraulic cylinder 216 also rotates with the piston retainer 220 and the piston 218, but is axially slidable relative to the piston retainer 220 and the piston 218, as disclosed in further detail below.

The hydraulic cylinder 216 is disposed radially outward of (e.g., around, surrounding) the piston retainer 220 and the piston 218. The hydraulic cylinder 216 is keyed to the piston retainer 220. As such, the piston retainer 220 rotates the hydraulic cylinder 216. However, the hydraulic cylinder 216 is slidable along the piston retainer 220 in the axial direction A (left and right in FIG. 2). This movement is used to change the pitch of the plurality of propulsor blades 154. The hydraulic cylinder 216 is coupled to the unison ring 208 at a joint 217 such that the hydraulic cylinder 216 is coupled to the plurality of propulsor blades 154 via the trunnion mechanism 202. The propulsor actuation system 200 can be activated to move the hydraulic cylinder 216 axially (left or right in FIG. 2), which causes the plurality of trunnion links 206 to rotate the plurality of trunnions 204, which rotates the plurality of propulsor blades 154 about the blade pitch axis P. As such, movement of the hydraulic cylinder 216 causes all of the propulsor blades 154 to rotate (e.g., pitch) simultaneously. When the hydraulic cylinder 216 is moved in a first axial direction (the forward direction, or to the left in FIG. 2), the plurality of propulsor blades 154 is rotated to a first end position (e.g., a feather position), and, when the hydraulic cylinder 216 is moved in a second axial direction (the rearward direction, or to the right in FIG. 2), the plurality of propulsor blades 154 is rotated away from the first end position and toward a second end position (e.g., a reverse position). However, in other embodiments, the propulsor actuation system 200 can be configured so that the movement of the hydraulic cylinder 216 is reversed.

Figure 3:
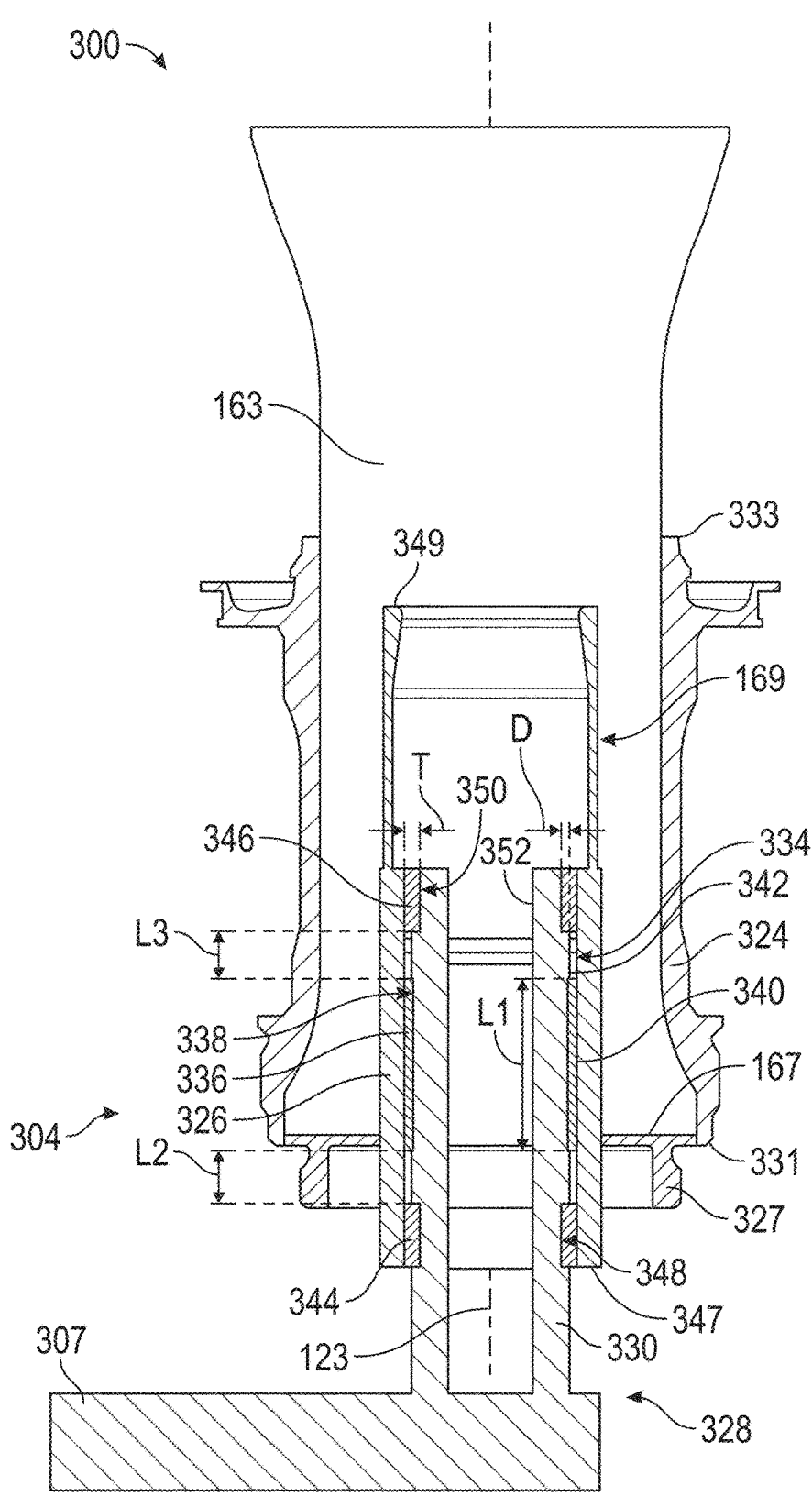
FIG. 3 is a schematic, cross-sectional view of another exemplary propulsor actuation system for the turbine engine of FIG. 1, taken along the longitudinal centerline axis of the turbine engine, according to an embodiment of the present disclosure.

FIG. 3 is a schematic, cross-sectional view of a propulsor actuation system 300 for the propulsor 152 of the turbine engine 110, taken along the longitudinal centerline axis 112 of the turbine engine 110, according to another embodiment. For illustrative purposes, only the blade spar 163 of the propulsor blade 154 and a portion of the propulsor actuation system 300 is shown in FIG. 3.

As shown in FIG. 3, the propulsor actuation system 300 includes a trunnion assembly 304 that is coupled to the blade spar 163 of the propulsor blade 154 (FIG. 2). In the illustrated embodiment, the trunnion assembly 304 includes an outer sleeve 324, an inner sleeve 326, a retaining ring 327, and an actuation member 328. The outer sleeve 324 is coupled to a root end 167 of the blade spar 163 and is removably attachable to the thrust bearings 226 (FIG. 2). The retaining ring 327 is coupled to an inner end 331 of the outer sleeve 324 at the root end 167 of the blade spar 163. The inner sleeve 326 is received within a spar opening 169 that extends into the root end 167 of the blade spar 163 toward the propulsor tip 153 (FIG. 1). In other words, the outer sleeve 324 is disposed radially outer relative to the inner sleeve 326 with respect to the blade pitch axis P (FIG. 2). The inner sleeve 326 is retained within the spar opening 169 by the retaining ring 327. The retaining ring 327 may be coupled to the outer sleeve 324 by one or more coupling means, e.g., threaded coupling, bolted coupling, compression, etc.

In some embodiments, the blade spar 163 may be formed of a composite material and the inner sleeve 326 may be formed of a metallic material. In other embodiments, both the blade spar 163 and the inner sleeve 326 may be formed of a metallic material. In some embodiments, the outer sleeve 324, the inner sleeve 326, and the retaining ring 327 may be formed of the same material. In some embodiments, the inner sleeve 326 may be formed of a first material and the outer sleeve 324 may be formed of a second material having one or more properties (e.g., hardness, density, stiffness, tensile strength, shear strength, thermal conductivity, etc.) that differ from those of the first material. In some such embodiments, the retaining ring 327 may be formed of the first material, the second material, or a third material having one or more properties (e.g., hardness, density, stiffness, tensile strength, shear strength, thermal conductivity, etc.) that differ from those of the first material and the second material. In some embodiments, the inner sleeve 326 is integrally formed with the retaining ring 327. In some embodiments, the blade spar 163 is integrally formed with one or both of the inner sleeve 326 or the retaining ring 327.

In the illustrated embodiment, the actuation member 328 of the trunnion assembly 304 has an actuation arm 307 that extends from an actuation sleeve 330 to engage the trunnion link 206 (FIG. 2). The actuation sleeve 330 is received within an inner sleeve opening 334 of the inner sleeve 326 that extends along a blade spar axis 123 of the blade spar 163 (which, in the illustrated embodiment, is aligned with an inner sleeve axis of the inner sleeve 326) such that the actuation sleeve 330 extends within the spar opening 169 of the blade spar 163 toward the outer end 333 of the outer sleeve 324 and the propulsor tip 153 (FIG. 1). Further, the inner sleeve 326 includes a plurality of teeth 336 that is received within a plurality of grooves 338 defined along the actuation sleeve 330 of the actuation member 328. In the illustrated embodiment, the plurality of teeth 336 protrudes radially inward from an inner surface 340 of the inner sleeve opening 334 of the inner sleeve 326 and extends axially along the inner sleeve opening 334. The plurality of grooves 338 is defined along an outer surface 342 of the actuation sleeve 330. In this way, the actuation sleeve 330 of the actuation member 328 is splined with the inner sleeve 326 to transmit rotational force to the inner sleeve 326 that causes the outer sleeve 324 and the inner sleeve 326 to rotate with the blade spar 163.

In the illustrated embodiment, the plurality of teeth 336 has a teeth length L1, as measured along the blade spar axis 123 from an inner axial end to an outer axial end of the plurality of teeth 336. The greater the teeth length L1 of the plurality of teeth 336, the greater moment of force or torque the actuation sleeve 330, via the plurality of grooves 338, can transmit to the inner sleeve 326, via the plurality of teeth 336, without risking damage to the plurality of teeth 336 or the plurality of grooves 338. In some embodiments, the teeth length L1 of the plurality of teeth 336 is a percentage of an overall length of the actuation sleeve 330, as measured along the blade spar axis 123, such as in a range of about 20% to about 90%, in a range of about 40% to about 85%, in a range of about 50% to about 80%, or in a range of about 60% to about 75%.

In some embodiments, the plurality of teeth 336 can include a first plurality of teeth having a first teeth length and a second plurality of teeth having a second teeth length that is different than the first teeth length. In some such embodiments, the first plurality of teeth and the second plurality of teeth can be disposed in an alternating arrangement with one of the first plurality of teeth disposed between two of the second plurality of teeth. In some embodiments, the inner sleeve 326 can be formed of a first material and the plurality of teeth 336 can be formed of a second material having one or more properties (e.g., hardness, density, stiffness, tensile strength, shear strength, thermal conductivity, etc.) that differ from those of the first material. For example, in some such embodiments, the inner sleeve 326 can be formed of a first material having a first hardness and the plurality of teeth 336 can be formed of a second material having a second hardness that is greater than the first hardness.

In some embodiments, the actuation sleeve 330 can include the plurality of teeth 336 and the inner sleeve 326 can define the plurality of grooves 338. In some embodiments, the plurality of teeth 336 can include three or more teeth and the plurality of grooves 338 can include three or more grooves. In some embodiments, a number of grooves of the plurality of grooves 338 can be greater than a number of teeth of the plurality of teeth 336. In some embodiments, each of the teeth of the plurality of teeth 336 can extend radially inward the same distance from the inner surface 340 of the inner sleeve opening 334 and each of the grooves of the plurality of grooves 338 can extend radially inward the same distance from the outer surface 342 of the actuation sleeve 330. In some embodiments, the plurality of teeth 336 can include a first set of teeth and a second set of teeth and the plurality of grooves 338 can include a first set of grooves and a second set of grooves. In some such embodiments, the first set of teeth can extend radially from the inner surface 340 to a first radial distance and the second set of teeth can extend radially from the inner surface 340 to a second radial distance that is different than the first radial distance. In some such embodiments, the first set of grooves can extend radially from the outer surface 342 to a first radial distance and the second set of grooves can extend radially from the outer surface 342 to a second radial distance that is different than the first radial distance.

With continued reference to FIG. 3, the trunnion assembly 304 further includes an inner pilot sleeve 344 and an outer pilot sleeve 346 arranged on the outer surface 342 of the actuation sleeve 330 that engage the inner surface 340 of the inner sleeve 326 adjacent axial opposing ends of the plurality of teeth 336. In particular, the inner pilot sleeve 344 is disposed toward an inner end 347 of the inner sleeve 326 and the outer pilot sleeve 346 is disposed toward an outer end 349 of the inner sleeve 326, axially opposite the inner end 347. In other words, the inner pilot sleeve 344 is arranged radially inner relative to the outer pilot sleeve 346 with respect to the longitudinal centerline axis 112 (FIG. 1). In this way, the inner pilot sleeve 344 and the outer pilot sleeve 346 reduce rotational forces exerted on the plurality of teeth 336 by distributing such forces axially along the blade spar axis 123.

In the illustrated embodiment of FIG. 3, the inner pilot sleeve 344 is received within an inner recess 348 defined along the outer surface 342 of the actuation sleeve 330, and the outer pilot sleeve 346 is received within an outer recess 350 defined along the outer surface 342 of the actuation sleeve 330. The inner recess 348 and the outer recess 350 of the actuation member 328 each extends circumferentially around the outer surface 342 of the actuation sleeve 330. The inner recess 348 and the outer recess 350 extend radially inward into the outer surface 342 of the actuation sleeve 330 to a distance "D" measured radially from the outer surface 342 to an inner surface 352 of the actuation sleeve 330. The distance D of the inner recess 348 and the outer recess 350 are sized to receive the inner pilot sleeve 344 and the outer pilot sleeve 346, respectively, having a thickness "T" measured radially.

In some embodiments, the distances D of the inner recess 348 and the outer recess 350 are substantially equal (i.e., within +/−5%). In some embodiments, the distance D of the inner recess 348 is greater than or less than the distance D of the outer recess 350. In some embodiments, the thicknesses T of the inner pilot sleeve 344 and the outer pilot sleeve 346 are substantially equal. In some embodiments, the thickness T of the inner pilot sleeve 344 is greater than or less than the thickness T of the outer pilot sleeve 346. In some embodiments, the inner pilot sleeve 344 and the outer pilot sleeve 346 are formed of the same material. In some embodiments, the inner pilot sleeve 344 may be formed of a first material and the outer pilot sleeve 346 may be formed of a second material having one or more properties (e.g., hardness, density, stiffness, tensile strength, shear strength, thermal conductivity, etc.) that differ from those of the first material.

With the actuation sleeve 330 of the actuation member 328 received within the inner sleeve 326, as shown in FIG. 3, the inner pilot sleeve 344 is disposed at an inner axial length L2, as measured along the blade spar axis 123, from an inner axial end of the plurality of teeth 336 and the outer pilot sleeve 346 is disposed at an outer axial length L3, as measured along the blade spar axis 123, from an outer axial end of the plurality of teeth 336. The greater the inner axial length L2 and the outer axial length L3, the greater the reduction of reaction forces from the propulsor blade 154 (e.g., bending moment forces) exerted on the plurality of teeth 336, which can improve the operational lifespan of the trunnion assembly 304 while reducing an overall weight of the trunnion assembly 304.

In some embodiments, the inner axial length L2 and the outer axial length L3 are substantially equal (i.e., within +/−5%). In some embodiments, the inner axial length L2 is greater than or less than the outer axial length L3. In some embodiments, the inner axial length L2 is a percentage of the outer axial length L3 in a range of about 60% to about 98%, in a range of about 70% to about 95%, or in a range of about 80% to about 90%. In some embodiments, the inner sleeve 326 can define one or both of the inner recess 348 or the outer recess 350 such that the inner sleeve 326 can receive one or both of the inner pilot sleeve 344 or the outer pilot sleeve 346. In some embodiments, the trunnion assembly 304 can include three or more pilot sleeves. For example, in some such embodiments, a third or a middle pilot sleeve can be arranged between the inner pilot sleeve 344 and the outer pilot sleeve 346.

Figure 4:
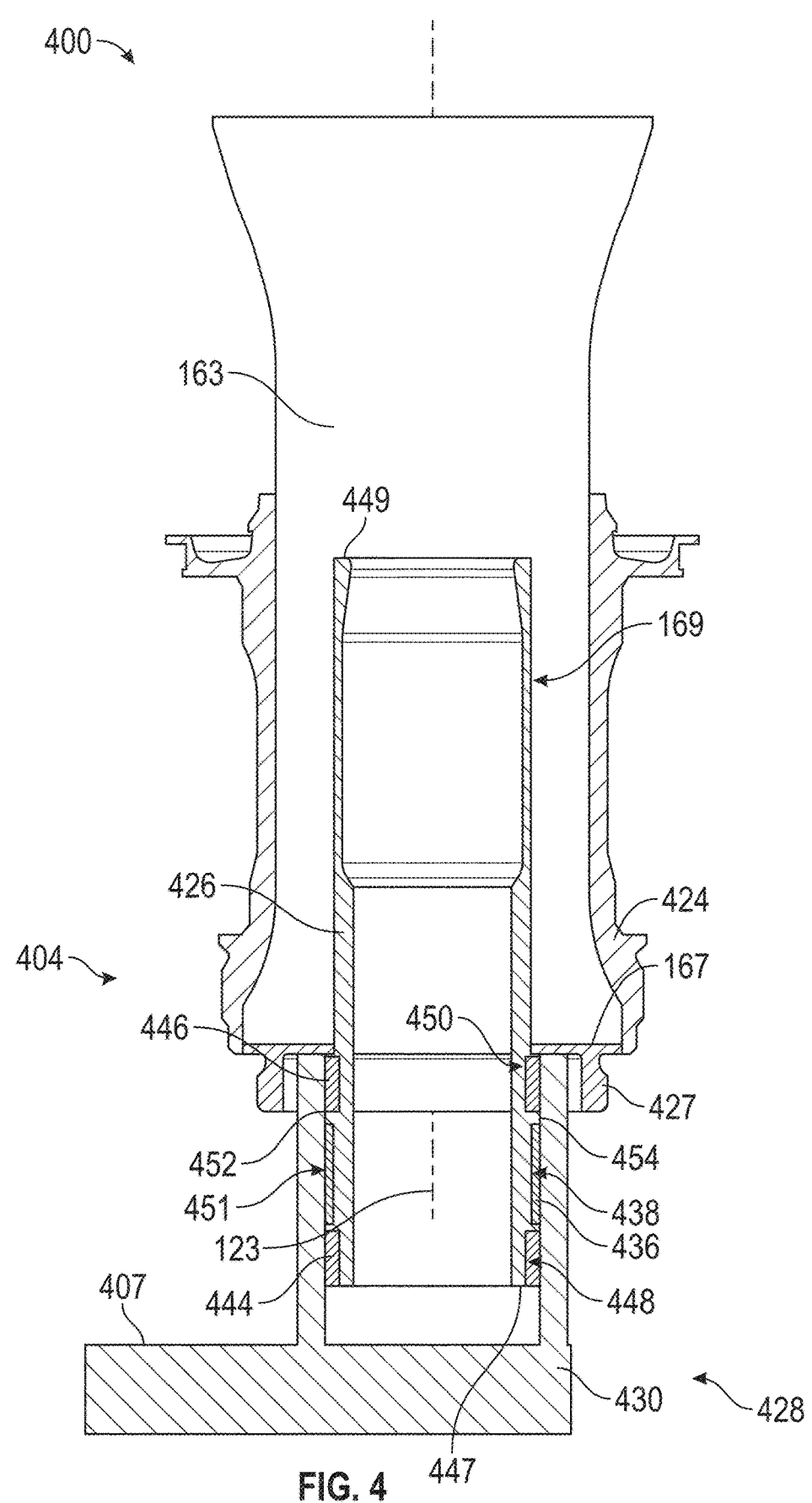
FIG. 4 is a schematic, cross-sectional view of yet another exemplary propulsor actuation system for the turbine engine of FIG. 1, taken along the longitudinal centerline axis of the turbine engine, according to another embodiment of the present disclosure.

FIG. 4 is a schematic, cross-sectional view of a propulsor actuation system 400 for the propulsor 152 of the turbine engine 110, taken along the longitudinal centerline axis 112 of the turbine engine 110, according to another embodiment. The propulsor actuation system 400 is substantially similar to the propulsor actuation system 300 of FIG. 3. The same reference numerals or similar reference numerals will be used for components of the propulsor actuation system 400 that are the same as, or similar to, the components of the propulsor actuation system 300 discussed above with regard to FIG. 3. The description of such components above of the propulsor actuation system 300 also applies to these components of the propulsor actuation system 400, and a detailed description of these components is omitted here.

As shown in FIG. 4, the propulsor actuation system 400 includes a trunnion assembly 404 that includes an outer sleeve 424, an inner sleeve 426, a retaining ring 427, and an actuation member 428. The outer sleeve 424, the inner sleeve 426, and the retaining ring 427 are coupled to the inner end of the blade spar 163, similar to the outer sleeve 324, the inner sleeve 326, and the retaining ring 327 of the trunnion assembly 304 of the propulsor actuation system 300 of FIG. 3. Further, the actuation member 428 has an actuation arm 407 that extends from an actuation sleeve 430 to engage the trunnion link 206 (FIG. 2), similar to the actuation arm 307 of the actuation member 328 of the trunnion assembly 304 of FIG. 3. However, in the illustrated embodiment of FIG. 4, an outer surface 454 of the inner sleeve 426 is received within an actuation sleeve opening 451 defined by an inner surface 452 of the actuation sleeve 430. In other words, the actuation sleeve 430 is disposed radially outward relative to the inner sleeve 426 with respect to the blade spar axis 123.

Further, the actuation sleeve 430 of the actuation member 428 of the actuation member 428 includes a plurality of teeth 436 that is received within a plurality of grooves 438 defined along the outer surface 454 of the inner sleeve 426. The plurality of teeth 436 protrudes radially inward from the inner surface 452 of the actuation sleeve 430 and extends axially along the blade spar axis 123. The plurality of grooves 438 is defined along the outer surface 454 of the inner sleeve 426. In this way, the actuation sleeve 430 of the actuation member 428 is splined with the inner sleeve 426 to transmit rotational force to the inner sleeve 426 that causes the outer sleeve 424 and the inner sleeve 426 to rotate with the blade spar 163.

The trunnion assembly 404 further includes an inner pilot sleeve 444 and an outer pilot sleeve 446 arranged on the outer surface 454 of the inner sleeve 426 that engage the inner surface 452 of the actuation sleeve 430 adjacent axial opposing ends of the plurality of teeth 436. In particular, the inner pilot sleeve 444 is disposed toward an inner end 447 of the inner sleeve 426 and the outer pilot sleeve 446 is disposed toward an outer end 449 of the inner sleeve 426, axially opposite the inner end 447. In this way, the inner pilot sleeve 444 and the outer pilot sleeve 446 can reduce reactive forces exerted on the plurality of teeth 436 by distributing such forces axially along the blade spar axis 123. In the illustrated embodiment, the inner pilot sleeve 444 is received within an inner recess 448 defined along the outer surface 454 of the inner sleeve 426, and the outer pilot sleeve 446 is received within a second or outer recess 450 defined along the outer surface 454 of the inner sleeve 426. Thus, in the illustrated embodiment of FIG. 4, the plurality of teeth 436 extends radially inward from the actuation sleeve 430 of the trunnion assembly 404, as opposed to the plurality of teeth 336 extending radially inward from the inner sleeve 326 of the trunnion assembly 304 of FIG. 3. Components of the propulsor actuation system 400 can be used in combination with any of the propulsor actuation systems disclosed herein.

Figure 5:
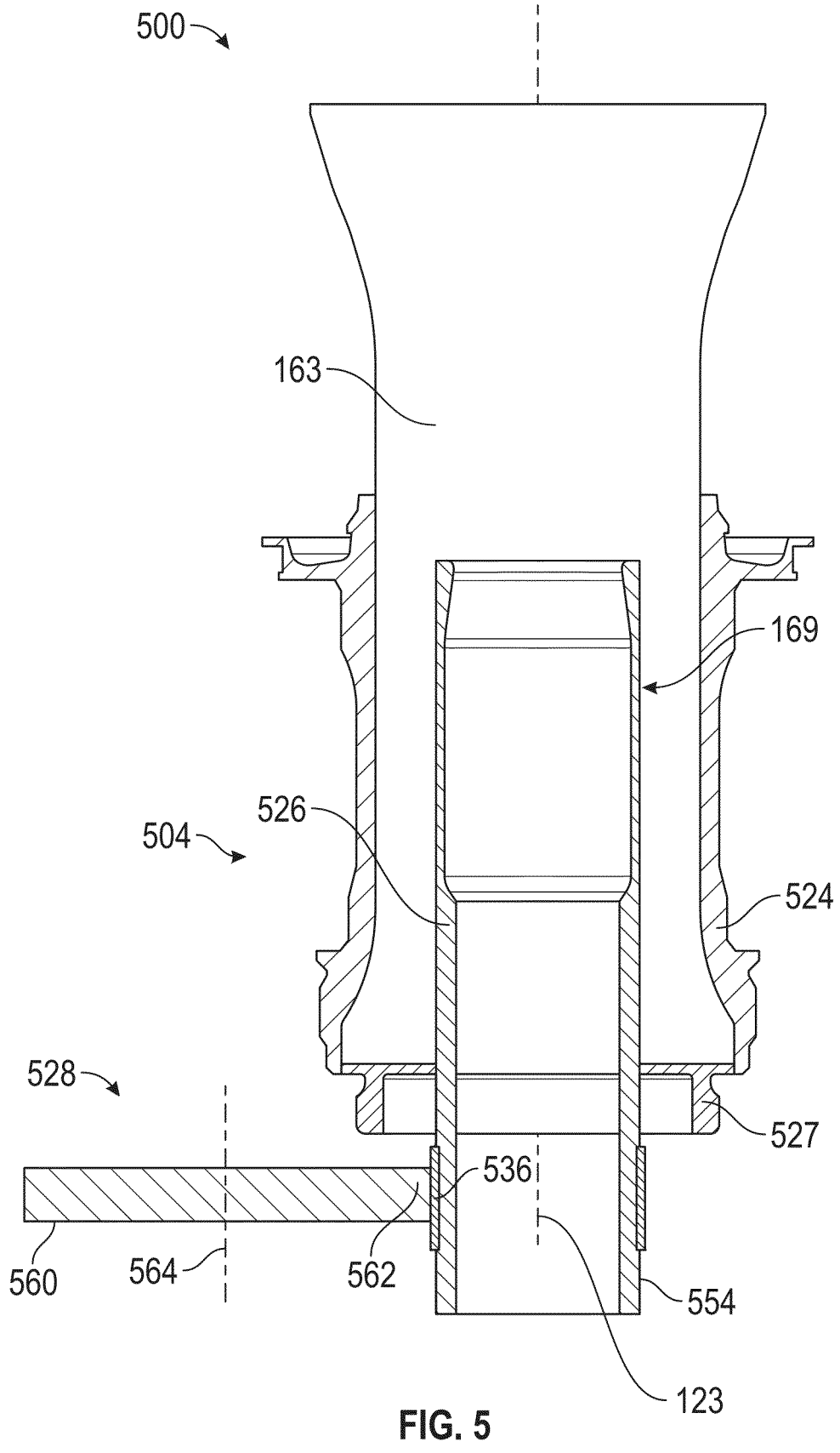
FIG. 5 is a partial, schematic, cross-sectional view of still another exemplary propulsor actuation system for the turbine engine of FIG. 1, taken along the longitudinal centerline axis of the turbine engine, according to another embodiment of the present disclosure.

FIG. 5 is a partial schematic, cross-sectional view of a propulsor actuation system 500 for the propulsor 152 of the turbine engine 110, taken along the longitudinal centerline axis 112 of the turbine engine 110, according to another embodiment. The propulsor actuation system 500 is substantially similar to the propulsor actuation systems 300, 400 of FIGS. 3 and 4, respectively. The same reference numerals or similar reference numerals will be used for components of the propulsor actuation system 500 that are the same as, or similar to, the components of the propulsor actuation systems 300, 400 discussed above with regard to FIGS. 3 and 4, respectively. The description of such components above of the propulsor actuation systems 300, 400 also applies to these components of the propulsor actuation system 500, and a detailed description of these components is omitted here.

As shown in FIG. 5, the propulsor actuation system 500 includes a trunnion assembly 504 that includes an outer sleeve 524, an inner sleeve 526, a retaining ring 527, and an actuation member 528. The outer sleeve 524, the inner sleeve 526, and the retaining ring 527 are coupled to the inner end of the blade spar 163, similar to the outer sleeve 324, the inner sleeve 326, and the retaining ring 327 of the trunnion assembly 304 of the propulsor actuation system 300 of FIG. 3. However, in the illustrated embodiment of FIG. 5, the actuation member 528 is a gear 560 having a plurality of gear teeth 562 that rotationally engages a plurality of teeth 536 included on an outer surface 554 of the inner sleeve 526.

The gear 560 can be caused to rotate about a gear axis 564 by the one or more actuators 159 (FIG. 2). In this way, the gear 560 transmits rotational force to the inner sleeve 526, via the plurality of teeth 536, that causes the outer sleeve 524 and the inner sleeve 526 to rotate with the blade spar 163. In the illustrated embodiment, the gear axis 564 is parallel to the blade spar axis 123. In some embodiments, the gear axis 564 can be disposed at an angle relative to the blade spar axis 123.

In some embodiments, the actuation member 528 can include a plurality of gears and the inner sleeve can include a plurality of sets of teeth. For example, in some embodiments, the actuation member 528 can include a first gear that is arranged to rotationally engage a first set of teeth and a second gear that is arranged to rotationally engage a second set of teeth. In some such embodiments, the first gear and the first set of teeth can provide coarse adjustments to the pitch P of the propulsor blade 154, while the second gear and the second set of teeth can provide fine adjustments to the pitch P of the propulsor blade 154. Components of the propulsor actuation system 500 can be used in combination with any of the propulsor actuation systems disclosed herein.

With reference to FIGS. 3 to 5, the particular configurations of the trunnion assemblies 304, 404, and 504 of the propulsor actuation systems 300, 400, and 500, respectively, can provide for easier disassembly of the propulsor blade 154 from the propulsor assembly 150 (FIG. 1) as compared to turbine engines without the benefit of the present disclosure. For example, referring specifically to the trunnion assembly 304 illustrated in FIG. 3, with the outer sleeve 324 disengaged from the disk 142 (FIG. 2) of the propulsor assembly 150, the blade spar 163, the outer sleeve 324, and the inner sleeve 326 can be moved relative to the actuation member 328 from an exterior of the engine 110 without having to remove the actuation member 328 from the engine 110. In other words, the particular configurations of the trunnion assemblies 304, 404, and 504 of the propulsor actuation systems 300, 400, and 500, respectively, can provide easier assembly and disassembly of the plurality of propulsor blades 154 of the propulsor assembly 150 of the engine 110, e.g., by permitting a user to remove individual propulsor blades 154 radially straight out of the engine 110 along the blade pitch axis P and without having to disassemble the propulsor hub 157 (FIG. 1) or other parts of the engine 110.

Figure 6:
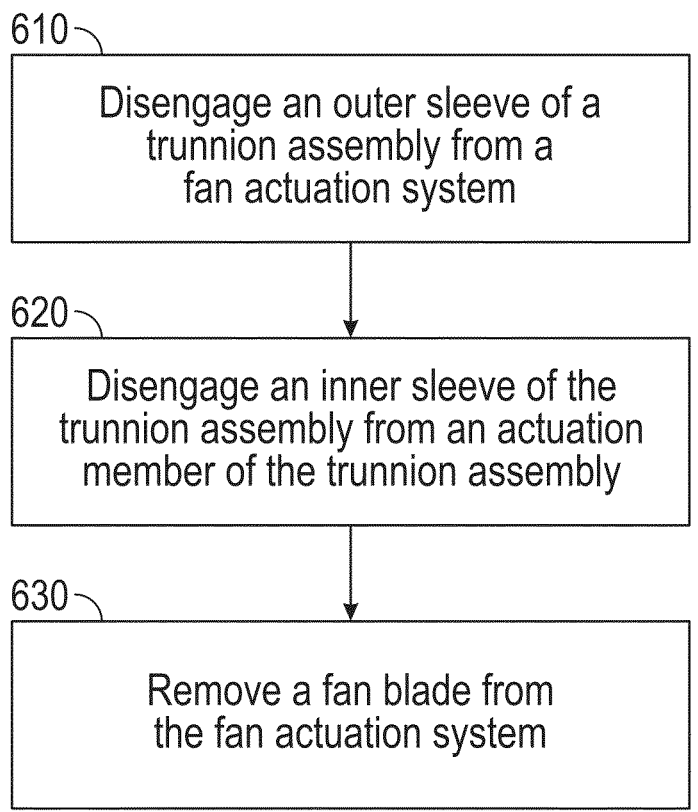
FIG. 6 is a flowchart showing a method of disassembling a propulsor blade from a propulsor actuation system of a turbine engine, such as any of the propulsor actuation systems of FIGS. 3 to 5, according to the present disclosure.

FIG. 6 is a flowchart showing a method 600 of disassembling a propulsor blade from a propulsor actuation system of a turbine engine, in which the propulsor blade is rotatable about a blade pitch axis by the propulsor actuation system. While reference is made to the propulsor actuation system 300 of FIG. 3, the method 600 can be utilized with any one of the propulsor actuation systems 300, 400, and 500 of FIGS. 3 to 5, respectively.

In step 610, the method 600 includes disengaging an outer sleeve of a trunnion assembly of a trunnion mechanism from the propulsor actuation system, the outer sleeve being coupled to a blade spar of the propulsor blade. For example, with reference to the propulsor actuation system 300 illustrated in FIG. 3, step 610 includes disengaging the outer sleeve 324 of the trunnion assembly 304 from the propulsor actuation system 300.

In step 620, the method 600 includes disengaging an inner sleeve of the trunnion assembly, which is coupled to the outer sleeve, from an actuation member of the trunnion assembly that is rotatably engageable by one or more actuators of the propulsor actuation system to rotate the propulsor blade about the blade pitch axis. For example, with reference again to the propulsor actuation system 300 illustrated in FIG. 3, step 620 includes disengaging the inner sleeve 326 from the actuation sleeve 330 of the actuation member 328.

In step 630, the method 600 includes removing the propulsor blade from the propulsor actuation system. For example, with reference again to the propulsor actuation system 300 illustrated in FIG. 3, step 630 includes removing the propulsor blade 154 (FIG. 2) having the blade spar 163 from the propulsor actuation system 300. In some embodiments, with the inner sleeve disengaged from the actuation member, as in step 620, the propulsor blade can be slidably removed from the propulsor actuation system along the blade pitch axis (e.g., the blade pitch axis P (FIGS. 1 and 2)), as in step 630.

In some embodiments, the inner sleeve can be splined with the actuation member (e.g., as in the embodiments of FIGS. 3 and 4). In some such embodiments, disengaging the inner sleeve from the actuation member, as in step 620, includes slidably removing an actuation sleeve of the actuation member from an inner sleeve opening of the inner sleeve (e.g., as in the embodiment of FIG. 3). In other such embodiments, disengaging the inner sleeve from the actuation member, as in step 620, includes slidably removing a sleeve portion of the inner sleeve from an actuation sleeve opening of an actuation sleeve of the actuation member (e.g., as in the embodiment of FIG. 4). In some embodiments, disengaging the inner sleeve of the trunnion assembly from the actuation member, as in step 620, further comprises disengaging a plurality of teeth of the inner sleeve from a plurality of grooves of the actuation member (e.g., as in the embodiment of FIG. 3). In some embodiments, disengaging the inner sleeve of the trunnion assembly from the actuation member, as in step 620, further comprises disengaging a plurality of teeth of the actuation member from a plurality of grooves of the inner sleeve (e.g., as in the embodiment of FIG. 4).

In some embodiments, the actuation member can be a gear that rotatably engages the inner sleeve (e.g., as in the embodiment of FIG. 5). In some such embodiments, disengaging the inner sleeve of the trunnion assembly from the actuation member, as in step 620, can include disengaging the gear from a plurality of teeth of the inner sleeve.

Embodiments of the present disclosure provide for an improved interface between a pitch-controlled airfoil or a propulsor and a pitching mechanism of an engine, which can provide positive engagement of the pitching mechanism and allow for easy flight-line replaceable propulsors of a propulsor assembly. Particularly, embodiments of the present disclosure can permit pure radial removal of a propulsor from a pitch change mechanism thus limiting the risk of damage to a trunnion of such mechanism and can provide reduction of downtime of an aircraft having an engine with such a propulsor actuation mechanism.

Further aspects are provided by the subject matter of the following clauses.

A propulsor assembly for a turbine engine includes a propulsor and a propulsor actuation system. The propulsor has a plurality of propulsor blades, each propulsor blade of the plurality of propulsor blades having a blade spar and being rotatable about a blade pitch axis. The propulsor actuation system includes one or more actuators for rotating the plurality of propulsor blades about the blade pitch axis and a trunnion mechanism including a plurality of trunnion assemblies. Each trunnion assembly of the plurality of trunnion assemblies is coupled to a respective propulsor blade of the plurality of propulsor blades and includes an outer sleeve coupled to the blade spar of the respective propulsor blade, an inner sleeve coupled to the outer sleeve, and an actuation member that engages the inner sleeve. The actuation member is rotatably engageable by the one or more actuators to rotate the respective propulsor blade about the blade pitch axis.

The propulsor assembly of the preceding clause, wherein the propulsor assembly further includes a retaining ring coupled to the outer sleeve and to the inner sleeve such that the inner sleeve is coupled to the outer sleeve via the retaining ring.

The propulsor assembly of any preceding clause, wherein the inner sleeve is removable from the actuation member such that the respective propulsor blade is removable from the actuation member and the trunnion mechanism.

The propulsor assembly of any preceding clause, wherein the respective propulsor blade is slidably removable from the actuation member and the trunnion mechanism along the blade pitch axis.

The propulsor assembly of any preceding clause, wherein the inner sleeve has a plurality of teeth, the actuation member engaging the plurality of teeth of the inner sleeve.

The propulsor assembly of any preceding clause, wherein the actuation member has a plurality of grooves that receive the plurality of teeth of the inner sleeve such that the actuation member is splined with the inner sleeve.

The propulsor assembly of any preceding clause, wherein the actuation member comprises a gear that is rotatable by the one or more actuators to engage the plurality of teeth of the inner sleeve to rotate the respective propulsor blade about the blade pitch axis.

The propulsor assembly of any preceding clause, wherein a gear axis of the gear is substantially parallel to a blade spar axis of the blade spar.

The propulsor assembly of any preceding clause, wherein the actuation member is splined with the inner sleeve.

The propulsor assembly of any preceding clause, wherein each trunnion assembly of the plurality of trunnion assemblies further includes an inner pilot sleeve arranged between the actuation member and the inner sleeve in an inner recess disposed toward an inner end of the inner sleeve and an outer pilot sleeve arranged between the actuation member and the inner sleeve in an outer recess disposed toward an outer end of the inner sleeve, opposite the inner end.

The propulsor assembly of any preceding clause, wherein the actuation member or the inner sleeve includes a plurality of teeth, and, with the actuation member splined with the inner sleeve, the inner pilot sleeve is disposed at an inner axial length from the plurality of teeth and the outer pilot sleeve is disposed at an outer axial length from the plurality of teeth.

The propulsor assembly of any preceding clause, wherein the inner axial length and the outer axial length are substantially equal.

The propulsor assembly of any preceding clause, wherein the actuation member has an actuation arm and an actuation sleeve that extends from the actuation arm, the actuation arm being engageable by the one or more actuators, the actuation sleeve being splined with the inner sleeve.

The propulsor assembly of any preceding clause, wherein the actuation sleeve of the actuation member is received within an opening of the inner sleeve, the inner sleeve having a plurality of teeth extending axially within the opening of the inner sleeve, the actuation sleeve of the actuation member having the inner recess, the outer recess, and a plurality of grooves that receive the plurality of teeth of the inner sleeve.

The propulsor assembly of any preceding clause, wherein at least a portion of the inner sleeve is received within an opening of the actuation sleeve, the actuation sleeve having a plurality of teeth extending axially within the opening of the actuation sleeve, the inner sleeve having the inner recess, the outer recess, and a plurality of grooves that receive the plurality of teeth of the actuation sleeve.

A method of disassembling a propulsor blade from a propulsor actuation system of a turbine engine, the propulsor blade being rotatable about a blade pitch axis by the propulsor actuation system. The method including disengaging an outer sleeve of a trunnion assembly of a trunnion mechanism from the propulsor actuation system, the outer sleeve being coupled to a blade spar of the propulsor blade, disengaging an inner sleeve of the trunnion assembly from an actuation member of the trunnion assembly, the inner sleeve being coupled to the outer sleeve, the actuation member being rotatably engageable by one or more actuators of the propulsor actuation system to rotate the propulsor blade about the pitch axis, and removing the propulsor blade from the propulsor actuation system.

The method of the preceding clause, wherein, with the inner sleeve disengaged from the actuation member, the propulsor blade is slidably removed from the propulsor actuation system along the blade pitch axis.

The method of any preceding clause, wherein the actuation member is splined with the inner sleeve.

The method of any preceding clause, wherein disengaging the inner sleeve from the actuation member includes slidably removing an actuation sleeve of the actuation member from an opening of the inner sleeve.

The method of any preceding clause, wherein disengaging the inner sleeve from the actuation member includes slidably removing at least a portion of the inner sleeve from an opening of an actuation sleeve of the actuation member.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A propulsor assembly for a turbine engine, the propulsor assembly comprising:
   a propulsor having a plurality of propulsor blades, each propulsor blade of the plurality of propulsor blades having a blade spar and being rotatable about a blade pitch axis; and
   a propulsor actuation system comprising:
      one or more actuators for rotating the plurality of propulsor blades about the blade pitch axis; and
      a trunnion mechanism including a plurality of trunnion assemblies, each trunnion assembly of the plurality of trunnion assemblies being coupled to a respective propulsor blade of the plurality of propulsor blades and comprising:
      an outer sleeve coupled to the blade spar of the respective propulsor blade;
      an inner sleeve coupled to the outer sleeve;
      an actuation member that engages the inner sleeve, the actuation member being rotatably engageable by the one or more actuators to rotate the respective propulsor blade about the blade pitch axis;
      an inner pilot sleeve arranged between the actuation member and the inner sleeve in an inner recess disposed toward an inner end of the inner sleeve; and
      an outer pilot sleeve arranged between the actuation member and the inner sleeve in an outer recess disposed toward an outer end of the inner sleeve, opposite the inner end.

2. The propulsor assembly of claim 1, further comprising a retaining ring coupled to the outer sleeve and to the inner sleeve such that the inner sleeve is coupled to the outer sleeve via the retaining ring.

3. The propulsor assembly of claim 1, wherein the inner sleeve is removable from the actuation member such that the respective propulsor blade is removable from the actuation member and the trunnion mechanism.

4. The propulsor assembly of claim 3, wherein the respective propulsor blade is slidably removable from the actuation member and the trunnion mechanism along the blade pitch axis.

5. The propulsor assembly of claim 1, wherein the inner sleeve has a plurality of teeth, the actuation member engaging the plurality of teeth of the inner sleeve.

6. The propulsor assembly of claim 5, wherein the actuation member has a plurality of grooves that receive the plurality of teeth of the inner sleeve such that the actuation member is splined with the inner sleeve.

7. The propulsor assembly of claim 5, wherein the plurality of teeth is defined on an outer surface of the inner sleeve or on an inner surface of the inner sleeve.

8. The propulsor assembly of claim 1, wherein the actuation member is splined with the inner sleeve.

9. The propulsor assembly of claim 8, wherein the actuation member or the inner sleeve includes a plurality of teeth, and, with the actuation member splined with the inner sleeve, the inner pilot sleeve is disposed at an inner axial length from the plurality of teeth and the outer pilot sleeve is disposed at an outer axial length from the plurality of teeth.

10. The propulsor assembly of claim 9, wherein the inner axial length and the outer axial length are substantially equal.

11. The propulsor assembly of claim 8, wherein the actuation member has an actuation arm and an actuation sleeve that extends from the actuation arm, the actuation arm being engageable by the one or more actuators, the actuation sleeve being splined with the inner sleeve.

12. The propulsor assembly of claim 11, wherein the actuation sleeve of the actuation member is received within an opening of the inner sleeve, the inner sleeve having a plurality of teeth extending axially within the opening of the inner sleeve, the actuation sleeve of the actuation member having a plurality of grooves that receive the plurality of teeth of the inner sleeve.

13. The propulsor assembly of claim 12, wherein the actuation sleeve of the actuation member defines the inner recess and the outer recess.

14. The propulsor assembly of claim 11, wherein at least a portion of the inner sleeve is received within an opening of the actuation sleeve, the actuation sleeve having a plurality of teeth extending axially within the opening of the actuation sleeve, the inner sleeve having a plurality of grooves that receive the plurality of teeth of the actuation sleeve.

15. The propulsor assembly of claim 14, wherein the inner sleeve defines the inner recess and the outer recess.

16. A method of disassembling a propulsor blade from a propulsor actuation system of a turbine engine, the propulsor blade being rotatable about a blade pitch axis by the propulsor actuation system, the method comprising:

disengaging an outer sleeve of a trunnion assembly of a trunnion mechanism from the propulsor actuation system, the outer sleeve being coupled to a blade spar of the propulsor blade;

disengaging an inner sleeve of the trunnion assembly from an actuation member of the trunnion assembly, the inner sleeve being coupled to the outer sleeve, the actuation member being rotatably engageable by one or more actuators of the propulsor actuation system to rotate the propulsor blade about the blade pitch axis; and removing the propulsor blade from the propulsor actuation system, wherein the trunnion assembly further includes an inner pilot sleeve and an outer pilot sleeve, the inner pilot sleeve being arranged between the actuation member and the inner sleeve in an inner recess disposed toward an inner end of the inner sleeve, and the outer pilot sleeve being arranged between the actuation member and the inner sleeve in an outer recess disposed toward an outer end of the inner sleeve, opposite the inner end.

17. The method of claim 16, wherein, with the inner sleeve disengaged from the actuation member, the propulsor blade is slidably removed from the propulsor actuation system along the blade pitch axis.

18. The method of claim 16, wherein the actuation member is splined with the inner sleeve.

19. The method of claim 18, wherein disengaging the inner sleeve from the actuation member includes slidably removing an actuation sleeve of the actuation member from an opening of the inner sleeve.

20. The method of claim 18, wherein disengaging the inner sleeve from the actuation member includes slidably removing at least a portion of the inner sleeve from an opening of an actuation sleeve of the actuation member.

\* \* \* \* \*